(12) United States Patent
Hornstein

(10) Patent No.: US 8,975,541 B2
(45) Date of Patent: Mar. 10, 2015

(54) WEIGHT-MEASURING DEVICE FOR VEHICLE LIFTING PLATFORMS

(75) Inventor: Roland Hornstein, Pfalzgrafenweiler (DE)

(73) Assignee: Roland Hornstein GmbH & Co., KG, Pfalzgrafenweiler (DE)

( * ) Notice: Subject to any disclaimer, the term of this patent is extended or adjusted under 35 U.S.C. 154(b) by 321 days.

(21) Appl. No.: 13/502,817

(22) PCT Filed: Oct. 29, 2010

(86) PCT No.: PCT/DE2010/001261
§ 371 (c)(1),
(2), (4) Date: Apr. 19, 2012

(87) PCT Pub. No.: WO2011/054335
PCT Pub. Date: May 12, 2011

(65) Prior Publication Data
US 2012/0211285 A1 Aug. 23, 2012

(30) Foreign Application Priority Data

Nov. 3, 2009 (DE) .......................... 10 2009 051 702

(51) Int. Cl.
*G01G 5/04* (2006.01)
*G01G 19/02* (2006.01)
(Continued)

(52) U.S. Cl.
CPC . *B66F 7/28* (2013.01); *B66F 17/00* (2013.01); *G01G 5/006* (2013.01); *G01G 5/04* (2013.01); *G01G 19/02* (2013.01)
USPC ............................. 177/146; 177/208; 177/254

(58) Field of Classification Search
CPC ... G01G 5/00–5/06; G01G 23/20; B66F 7/28; B66F 17/00

USPC .......................... 177/146, 208, 209, 254, 186
See application file for complete search history.

(56) References Cited

U.S. PATENT DOCUMENTS 3,080,018 A * 3/1963 Sinclair .......................... 187/219
3,633,696 A * 1/1972 Kleysteuber .................. 177/208
(Continued)

FOREIGN PATENT DOCUMENTS

DE 29 37 582 A1 4/1981
DE 93 12 286.1 10/1993
(Continued)

OTHER PUBLICATIONS

"Why Air Cylinders Fail (and What's to be Done About it?)" by Ernie Lunski (http:www.machinerylubrication.com/); May 1, 2014.*
(Continued)

*Primary Examiner* — Randy W Gibson
(74) *Attorney, Agent, or Firm* — Renner, Otto, Boisselle & Sklar, LLP

(57) ABSTRACT

A weight-measuring device (1) for vehicle lifting platforms, which can be arranged between a height-adjustable supporting element (15) and a vehicle which is to be lifted, wherein an upper part (2) and a lower part (3) form a cavity (12) which is filled with a hydraulic fluid (13) and/or with a gas and generates in the cavity (12), by means of a load (19, 20) lying on top, a hydraulic or gas pressure which is measured and/or indicated with a pressure gauge and/or indicator device (4) which is at least partially integrated in the upper part (2) and/or in the lower part (3), with the upper part (2) being composed of rubber and/or of plastic and/or of some other elastic material.

9 Claims, 3 Drawing Sheets

(51) Int. Cl.
*B66F 7/28* (2006.01)
*B66F 17/00* (2006.01)
*G01G 5/00* (2006.01)

(56) References Cited

U.S. PATENT DOCUMENTS

| | | | | |
|---|---|---|---|---|
| 3,710,880 | A | * | 1/1973 | Arden ............................ 177/137 |
| 3,752,245 | A | * | 8/1973 | Johnson ......................... 177/208 |
| 3,842,667 | A | * | 10/1974 | Alexander et al. ........ 73/862.641 |
| 4,007,800 | A | * | 2/1977 | Janach et al. ................. 177/209 |
| 4,184,555 | A | * | 1/1980 | Maltby et al. ................. 177/208 |
| 4,286,680 | A | * | 9/1981 | Maltby et al. ................. 177/208 |
| 4,489,798 | A | * | 12/1984 | Menon ........................... 177/209 |
| 4,498,550 | A | * | 2/1985 | Menon ........................... 177/209 |
| 4,537,266 | A | | 8/1985 | Greenberg |
| 4,569,407 | A | * | 2/1986 | Gray et al. ..................... 177/208 |
| 4,583,606 | A | * | 4/1986 | Menon ........................... 177/208 |
| 4,775,019 | A | * | 10/1988 | Scheuter et al. .............. 177/208 |
| 4,852,675 | A | * | 8/1989 | Wang ............................. 177/208 |
| 7,705,251 | B2 | * | 4/2010 | Herrmann ..................... 177/211 |
| 8,431,839 | B2 | * | 4/2013 | Hornstein ..................... 177/141 |
| 8,431,840 | B2 | * | 4/2013 | Hornstein ..................... 177/141 |
| 2008/0296071 | A1 | * | 12/2008 | Herrmann ..................... 177/136 |
| 2010/0276212 | A1 | | 11/2010 | Hörnstein |

FOREIGN PATENT DOCUMENTS

| | | |
|---|---|---|
| DE | 10 2007 053 757 B3 | 3/2009 |
| FR | 1 426 249 A | 1/1996 |
| GB | 2 001 766 A | 2/1979 |

OTHER PUBLICATIONS

"Effects of air on hydraulic systems" by Vincent Magorien; Oct. 1967.*
"Air Contamination in Hydraulic Systems" (http:www.hydraulicsonline.co.uk/) © 2013.*
International Search Report for International Application No. PCT/DE2010/001261 mailed Apr. 12, 2011.

* cited by examiner

WEIGHT-MEASURING DEVICE FOR VEHICLE LIFTING PLATFORMS

TECHNICAL FIELD OF INVENTION

This invention relates to a weight-measuring device for vehicle lifting platforms, as used, among others, in automobile repair shops for the purpose of lifting vehicles for repair and maintenance work. The invention is specified with reference to the use of a vehicle lifting platform with pivoting support arms, but without limiting the invention to a vehicle lifting platform of this type.

Vehicle lifting platforms with pivoting support arms are widely used, among other reasons because they are able to accept a wide variety of different vehicles due to the adjustability of their four support arms. At the outer end of the support arms, so-called vehicle supports are arranged. These vehicle supports usually comprise a vertically arranged threaded spindle with a length of approximately 80 to 100 mm that is welded to a round horizontal steel plate with a diameter of approximately 100 to 120 mm. On this steel plate, a vehicle rest is attached that consists of an elastically deformable material. The steel plate is the structurally relevant bearing part. The vehicle rest serves as the rest for the vehicle. It is usually made of rubber or of plastic and is intended to prevent possible damage to the contact areas of the vehicle underside when the vehicle is lifted.

When lifting the vehicles, the operator must ensure that the vehicle to be lifted rests securely on the four vehicle rests. "Securely" here means that, on the one hand, the four contact spots are as far apart from each other in the longitudinal and in the transverse direction, and that, on the other hand, the associated contact area on the vehicle underside is centered on the vehicle rest to the extent possible in order to prevent the vehicle form sliding off in case of unfavorable operating situations. In addition, neither the overall carrying capacity of the vehicle lifting platform, nor the permissible load distribution, nor the maximum carrying capacity of an individual support arm must be exceeded. Hazards or accidents may result if the lifted vehicle rests on only two or three support arms because of unfavorable conditions, with the effect that one or even two support arms carry no load or only a small one.

Unfortunately, vehicles are frequently supported in the longitudinal and in the transverse direction not in accordance with their center of gravity—i.e. with an even distribution of the load—but with a "one-sided or uneven" load distribution. One of the reasons for this lifting with a one-sided or uneven load distribution is the circumstance that the center of gravity of the vehicle is not marked, and is therefore not identifiable. Also, some vehicles are lifted in loaded condition, which further complicates the identification of the vehicle center of gravity. Finally, vehicles are deliberately lifted with a one-sided and uneven load distribution in order to improve the accessibility of certain areas of the vehicle underside so that special maintenance and repair operations are easier to perform. "One-sided or uneven" load distribution means a longitudinal and/or transverse displacement of the vehicle relative to the vehicle lifting platform.

DISCUSSION OF RELATED ART

The disclosure DE 29 37 582 A1 describes a vehicle lifting platform, specifically a two-column lifting platform for automobiles wherein force measuring devices are arranged on the support elements whose output signals are transmitted to a downstream safety circuit that compares the signals with voltage values that are proportional to permissible loads and activates a warning and/or braking device when the permissible voltage values are exceeded. The system disclosed in DE 29 37 582 A1 is an integral component of the vehicle lifting platform. For example, it cannot be applied to vehicle lifting platforms that are already in operation. In addition, this system is very complicated and therefore also expensive.

The design patent G 93 12 286.1 specifies a vehicle lifting platform with several support arms wherein, at the free ends of the support arms, removable support plates or similar devices are arranged on which sensors, switches, or similar devices responding to weight or one-sided loading are arranged that are connected with a display, a monitoring device, or a similar device. It has the disadvantage of requiring a multitude of sensors, contact points, parts with jointed supports, etc. which involves a high susceptibility to malfunctions and high production costs, as experience shows.

The patent disclosure DE 10 2007 053 757 specifies a support element for vehicle lifting platforms wherein the pressure measurement is accomplished via a vertically displaceable transfer element that must be ring-shaped and seals a pressure chamber that is also ring-shaped. This solution has the disadvantage that for the pressure measurement a transfer element as such is required that needs to fulfill a sealing function, performs a relative motion that generates friction, and that in terms of its arrangement needs to rest vertically displaceably directly on a support member of the vehicle lifting platform. This means that the pressure measuring device can only be arranged in a non-height-adjustable component, a circumstance that requires additional components contributing additional influential and interference factors to the measuring system and results in a complex structure. This, in turn, requires high production expenses, close tolerances, and high surface qualities of the required components, especially of the annular grooves and the support spots.

SUMMARY OF THE INVENTION

The present invention addresses the problem of improving the operation and the safety when supporting and lifting vehicles with vehicle lifting platforms by means of a simple, robust, and cost-efficient weight measurement. It is to guide the operator and make it easier for him to support each of the various vehicles with an even and permissible load distribution. In addition, the load display is to take place directly at the vehicle support in question so that a separate display device is not needed.

Other advantages are that practically all vehicle lifting platform that are already in use can be retrofitted very simply and very cost-efficiently to attain this new safety standard, without requiring changes or modifications on their support arms or their vehicle supports.

According to the invention, this is achieved by a weight measuring device according to Claim 1. Advantageous embodiments and design developments are the subject of the related claims.

The weight measuring device according to the invention for vehicle lifting platforms can be implemented in different ways. In order to ensure a simple structure, a simple and compact measuring system, and, therefore, a cost-efficient production process, the entire measuring technology, data pickup, and data display of the weight measuring process is to be installed in or on components of the weight measuring device, preferably in the vehicle rests made of rubber or of plastic or some similar material.

Since the retrofitting of vehicle lifting platforms that are already in use is an important aspect, a simple construction takes into account the proven shapes and materials of known vehicle lifting platforms, specifically the horizontally arranged steel plate referred to above. On this steel plate—hereinafter referred to as "support element of the vehicle rest"—the vehicle rest is attached, usually consisting of elastic material and having a slip-resistant surface. In most embodiments, the support element of the vehicle rest is permanently attached to a threaded spindle. In this manner, the height of the vehicle support in relation to the support arm can be adjusted by rotating it around its longitudinal axis and can be matched to the contour or the level of the vehicle underside.

The support element of the vehicle rest is usually round or rectangular. The material is usually steel or, in modern versions, plastic or a similar material. The support element of the vehicle rest is the exclusively determinant interface with the weight measuring device according to the invention.

The weight measuring device for vehicle lifting platforms according to the invention consists preferably of an upper part, a lower part, a pressure measuring device, and the required connecting, joining, and covering parts.

Visually distinct, the upper part comprises a "preferred or especially well suited" holding area located on the inside. In order to achieve improved operating reliability, it is suggested that the user place the upper part under the vehicle in such a way that the holding contact point of the vehicle underside is centered as far as possible in the preferred area. This holding area, being especially well suited because it is safe, consists preferably of a round surface section located on the inside that is a few millimeters higher than the surface surrounding it. It has a different surface structure and preferably also a different color than the outer surface section surrounding it. The inside surface section may be black, for example. The color of the outer surrounding surface section may be selected to have a warning signal effect, such as bright red. This will readily suggest to every user that supporting the vehicle on the inner, higher black surface offers better safety and better protection from hazards than the outer, lower red surface. Due to its protruding greater height, the inner surface is better suited as contact surface for the support points than the outer annular surface. Preferably, the upper part is of one piece and can be made, for example, in a tool or casting mold. It consists of a rubber or plastic material or some other suitable material. Preferably, the material is flexible and has high tensile strength. Reinforcements such as fabrics, grids, fibers or also plate-shaped parts made of other materials may be bonded to the material, or embedded in the upper part. Likewise, relief grooves, notches, ribs or similar features may be located on the topside and/or the underside of the upper part through which a certain and intended deformation is achieved, regardless of whether a centric or an eccentric load rests on the upper part. In addition, the upper part may be equipped with devices such as contact surfaces, recesses, and/or embedded connecting elements for the mounting and pressure-tight connection of a suitable pressure measuring device, pressure display device, or pressure pick-up. In another embodiment, parts of the pressure measuring device, pressure display device, or pressure pick-up may already be integrated completely or partially in the upper part. In yet another embodiment, the upper part may consist of multiple parts in order to simplify the production and assembly of the individual parts.

Preferably, the lower part consists of a plate-shaped, thin-walled material that has a shape or recess on its underside that permits mounting or sliding it on the support element of the vehicle rest with a tight fit. Devices such as lugs, clamps, etc. are provided for its fixed positioning, holding it in place, and its non-slip, captive attachment on the support element of the vehicle rest.

In another embodiment, the lower part may consists of a molded body in which features have been provided such as contact surfaces, recesses, and/or embedded connecting elements for the mounting and pressure-tight connection of a suitable pressure measuring device, pressure display device, or pressure pick-up. In another embodiment, parts of the pressure measuring device, pressure display device, or pressure pick-up may already be integrated completely or partially in the lower part. In another embodiment, the lower part may consist of multiple parts in order to simplify the production and assembly of the individual parts. In yet another embodiment, the lower part may be formed by the support element of the vehicle rest and be therefore designed as a structurally bearing component to which the upper part is attached.

The upper and the lower part are positively and tightly joined with each other, preferably at their outer circumference and/or at their outer edge areas, jointly forming a type of membrane cylinder with a simple action that does not have a piston rod. When the upper part is exposed to a load by a vehicle resting on it, it deforms and causes an increase in pressure. This increase in pressure matches the imposed load very precisely because membrane cylinders work almost without friction and hysteresis due to their special design. The positive and tight connection of the upper and the lower part can be performed, for example, in a tool with a controlled production process where parameters such as tool and material temperature, contact pressure, and contact time are matched in such a way that a non-detachable and tight joint between the upper and the lower part is ensured. The connection may also be accomplished by vulcanizing, bolting, clamping, gluing, stretching, or some other suitable method. A cavity is located between the upper and lower part. Preferably, this cavity has a round, vaulted shape and is sealed so that it can be filled with a hydraulic medium or a gas, thereby forming a pressure chamber when a load rests on the upper part. Preferably, the outer diameter or the outer contour of the cavity is larger than the diameter or the outer contour of the inner surface section that is slightly higher than the surrounding outer surface section. The upper and/or lower part may contain tightly sealable openings for bleeding and filling the cavity.

For the measurement and the display of the pressure, the upper part preferably contains a mechanically-hydraulically or mechanically-pneumatically acting pressure measuring device, preferably a pressure gauge. In order to ensure that it is easy to read, the gauge is arranged at the circumference of the upper part. In order to keep the structural height of the upper part and therefore the clearance between the vehicle supports and the vehicle underside as low as possible, the shape of the pressure gauge is preferably slender and elongated, comparable to a fever thermometer. The display direction and motion is horizontal, i.e. in the longitudinal or the circumferential direction. In order to keep the size of the upper and lower part as compact as possible and to protect the pressure gauge from damage, it is integrated at least partially, but preferably as much as possible, in the upper and/or the lower part.

Preferably, the pressure gauge consists of a slender, elongated gauge housing consisting of a clear or transparent material, for example borosilicate glass, plexiglass, or some other suitable material that is preferably flexible. The gauge housing may have a straight or a curved shape. The gauge housing may have a scale, possibly multicolored, for indicating the pressure. As an alternative, this scale may also be located in an easily visible location on the upper part. The pressure gauge housing is tightly sealed on both ends.

Preferably, it is connected pressure-tight at one end with the pressure chamber via a connecting element. At its other end, the pressure gauge housing is tightly sealed. This can be accomplished by a sealing cover element that may comprise a valve or a device for introducing a gas.

In the pressure gauge housing, a freely moving, sealed piston is arranged that is preferably equipped with a mark that simultaneously serves as an indicator for showing the existing hydraulic or pneumatic pressure. The hydraulic fluid or the gas from the pressure chamber impinges on the sealed piston. Behind the sealed piston, some type of compression spring is arranged, preferably a gas spring.

The effective surface of the cavity between the upper and the lower part of the vehicle rest and the imposed load generate a pressure in the cavity that is characteristic for the imposed load. The pressure measuring and display device measure and indicate this pressure.

The advantages of the invention are the simple and very cost-efficient possibilities for increasing the safety standard when supporting and lifting vehicles by means of vehicle lifting platforms. This applies to new vehicle lifting platform as well as to those already in use. The combination of an improved visual controllability of the safe (centered) positioning of the vehicle on the vehicle rest, and the mechanical-hydraulic or mechanical-pneumatic weight measurement/load check along with their differentiated display make it easier for the operator to lift vehicles safely.

Additional advantages are its compact design, the integrated mechanical-hydraulic or mechanical-pneumatic measuring system that does not require a hydraulic piston, no piston seal, and no mechanical processing of components for transmitting forces, all of which are usually required with pneumatic or hydraulic components that transmit forces and perform linear motions.

Below, the invention is described in detail and explained with reference to the embodiment shown in the drawing.

DETAILED DESCRIPTION OF THE INVENTION

Figure 1:
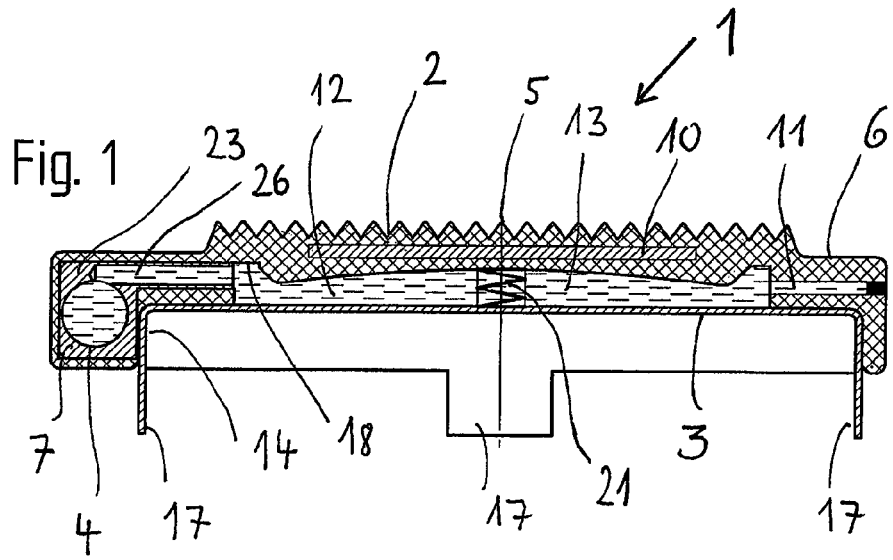
FIG. 1 shows a simplified, schematic, axial section view (not to scale) of a weight measuring device according to the invention.
Figure 2:
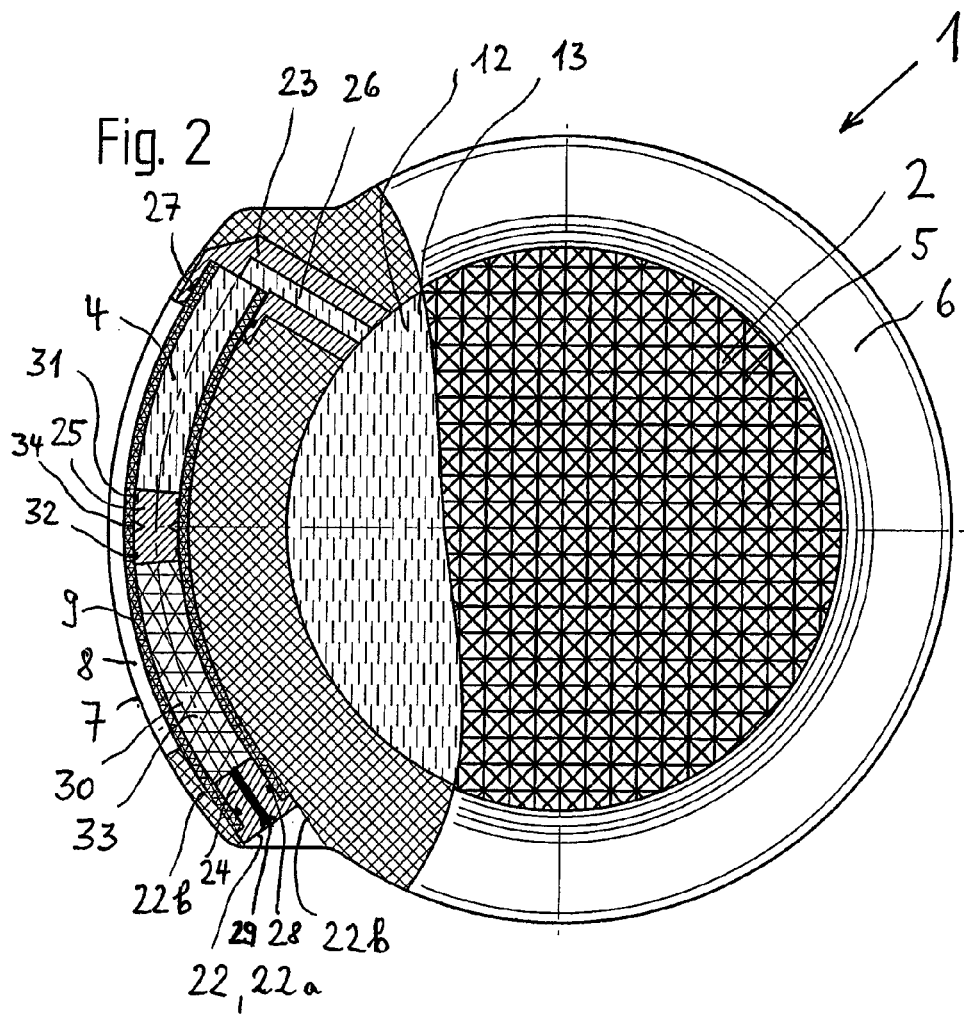
FIG. 2 shows a simplified, schematic, partial section top view (not to scale) of a weight measuring device according to the invention.

FIG. 1 shows an axial section view, and FIG. 2 shows a partial section top view of a weight measuring device 1 for vehicle lifting platforms that consists of an upper part 2, a lower part 3, and a pressure measuring and display device 4.

The upper part 2 is a molded part made of a flexible elastomeric material with high tensile strength. It comprises an inner, round surface section 5 that is visually and geometrically distinct and is surrounded by an annular outer surface section 6. The inner surface section 5 has a non-slip surface and its height is greater by a few millimeters than that of the surrounding outer surface section 6. The color of the inner surface section 5 is black. The color of the surrounding outer surface section 6 is signal red. In a partial section of the circumference, the upper part 2 has a bulge 7 that has a lateral opening 8. Through this opening 8, the housing 9 of the pressure measuring and display device 4 is visible. A thin round steel plate is arranged in the upper part 2 as reinforcement 10 within the inner surface section 5.

Arranged laterally, the upper part 2 comprises a tightly sealable canal 11 for bleeding and filling the cavity 12 that is designed as a pressure chamber and is filled with a hydraulic fluid 13. On the underside of the upper part 2, an annular circular groove 18 is arranged which at this point has the effect of weakening the upper part 2 in terms of structure and strength, with said weakening leading to a certain, intentional, and approximately uniform deformation when a centric load 19 or an eccentric load 20 acts on the surface section 20. In addition, the upper part 2 comprises molded-in shapes 22, such as the recesses 22a and the contact surfaces 22b that serve for positioning and holding of parts or for an easier assembly or for a more attractive appearance.

Between the upper part 2 and the lower part 3, a compression spring 21 is arranged that, when unloaded, has the effect of returning the upper part 2 to its starting position without hydraulic assistance by the pressure measuring and display device 4.

The lower part 3 is a thin steel sheet with a cylindrical edge that is bent downward, i.e. away from the upper part 2, at 90 degrees, thereby comprising a concentric recess 14. This concentric recess 14 is round and is easily mountable to fit on the support element 15 that is permanently and rigidly connected with a threaded spindle 16. For a rigid but non-permanent attachment of the lower part 3 on the support element 15, the lower part 3 comprises four lugs 17 that are bent in a U-shape by 90 degrees after it has been placed on the support element 15. The lugs 17 bent towards the inside engage the support element 15 from below.

The pressure measuring and display device 4 consists of a tube-shaped housing 9 that is bent to match the shape of the bulge 7, a tightly inserted connecting element 23 at one end, a sealing closing element 24 at the other end, and a piston 25 moving freely inside the housing 9. The connecting element 23 comprises a canal 26 that is connected with the cavity 12 and is sealed relative to the housing 9 by means of a seal 27. The closing element 24 also comprises a seal 28 and includes a self-closing sealing valve 29 for filling in a gas 30. With the seal 31, the piston 25 is sealed against the hydraulic fluid 13 and with the seal 32 against the gas filling 30 of the gas spring 33.

If there is no load resting on the upper part 2 or the inner round surface section 5, the cavity 12 is in pressure-free condition. Then, the piston 25 rests against the connecting element 23 due to the effect of the gas spring 33. The display mark 35 will then indicate a value of zero on the scale. If a load 19, 20 is applied, a hydraulic pressure is generated in the cavity 12 that passes through the canal 26 into the housing 9 where it exerts a force on the piston 25. Depending on the magnitude of the imposed load 19, 20, the piston 25 compresses the gas 30 in accordance with the spring rate or the characteristics of the gas spring, and the piston 25 moves in the horizontal display direction towards the closing element 24. The display mark 34 will then indicate the measured value on the scale 35.

Figure 3:
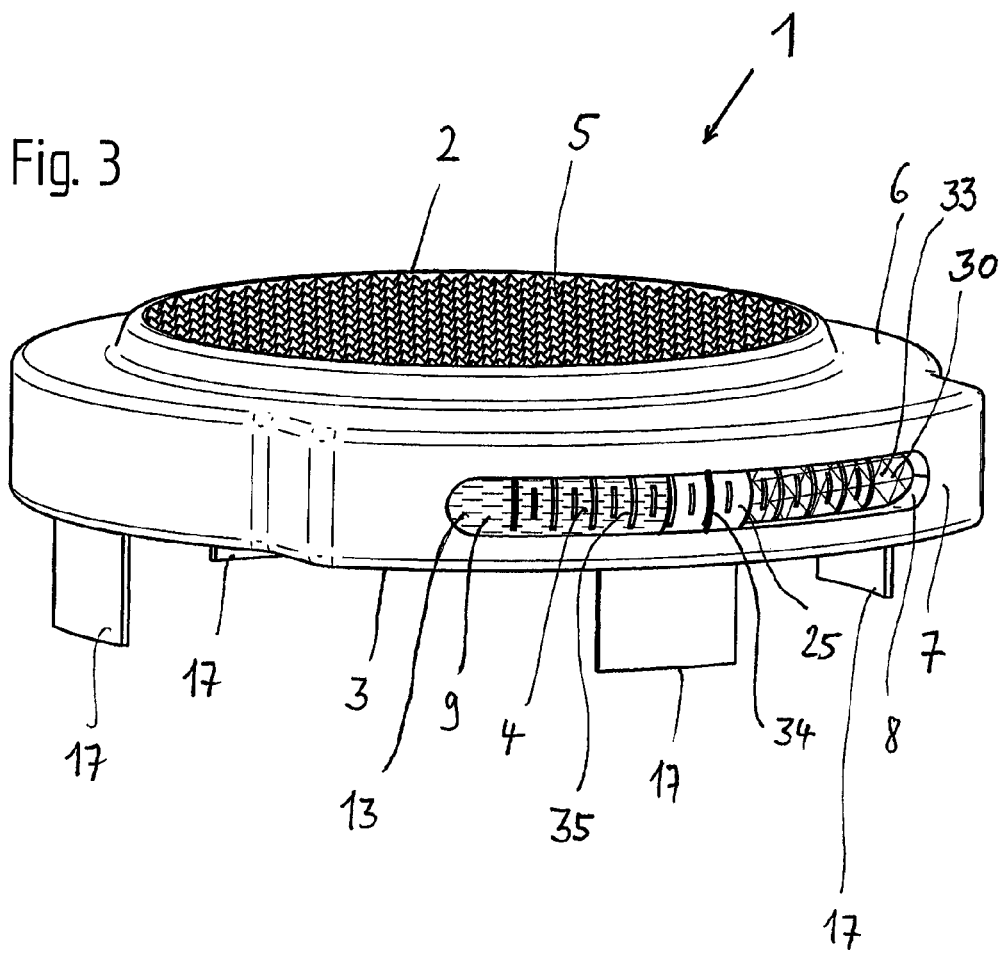
FIG. 3 shows a simplified, schematic, perspective view (not to scale) of a weight measuring device according to the invention.

FIG. 3 shows the weight measuring device 1 in a perspective view. Due to the lateral opening 8 in the upper part 2, the scale 35 on the housing 9 of the pressure measuring and display device 4 can be seen. The piston 25 is approximately in a center position. The four lugs 17 are in perpendicular position so that the weight measuring device 1 can be placed on the support element 15 of a vehicle rest in a simple way.

Figure 4:
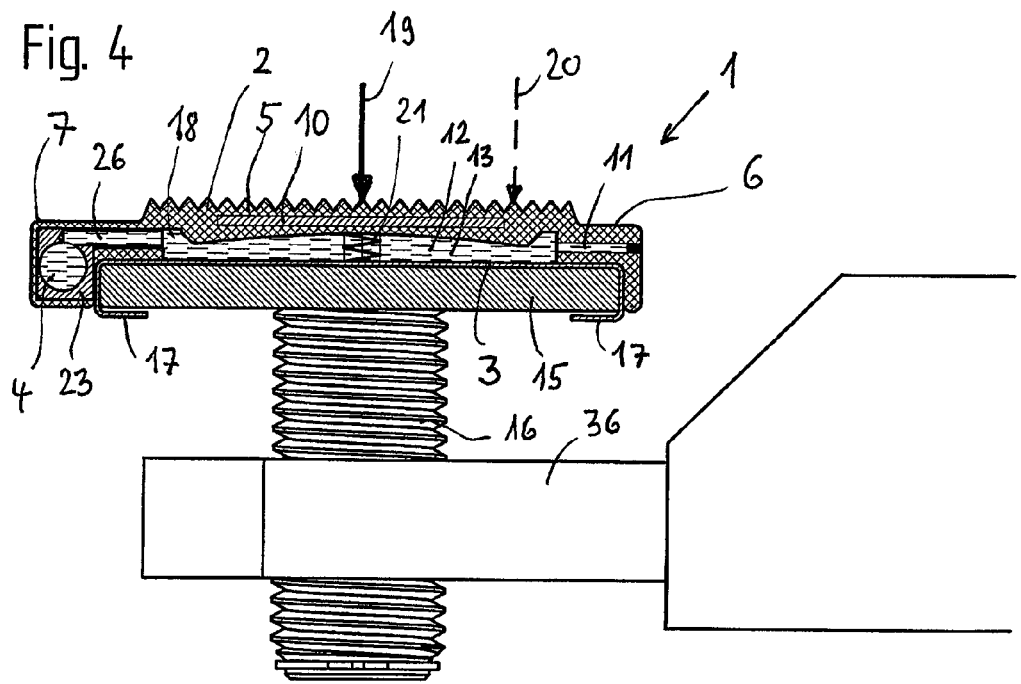
FIG. 4 shows a simplified, schematic view (not to scale) of a weight measuring device according to the invention, that is arranged permanently and detachably on the height adjustable support element.

FIG. 4 shows the weight measuring device 1, as attached with the bent-over lugs 17 on the support element 15 of the vehicle rest, and connected via the threaded spindle 16 height-adjustably in the support arm 36 of a vehicle lifting platform (not shown).

Figure 5:
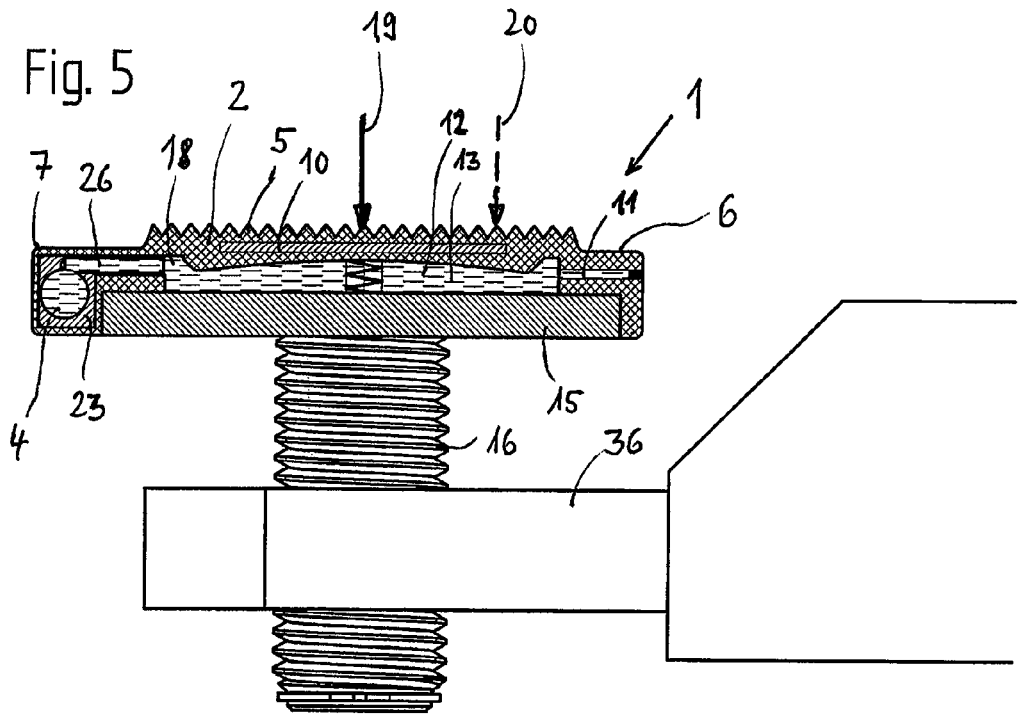
FIG. 5 shows a simplified, schematic view (not to scale) of a weight measuring device according to the invention, that is arranged permanently and non-detachably on the height adjustable support element.

FIG. 5 shows the weight measuring device 1 where the upper part 2 is attached positively and permanently on the support element 15 of the vehicle rest, and connected via the threaded spindle 16 height-adjustably in the support arm 36 of a vehicle lifting platform (not shown).

LIST OF REFERENCE NUMBERS

1 Weight measuring device
2 Upper part
3 Lower part
4 Pressure measuring and display device
5 Inner surface section
6 Outer surface section
7 Bulge
8 Opening
9 Housing
10 Reinforcement
11 Canal
12 Cavity/Pressure chamber
13 Hydraulic fluid
14 Recess
15 Support element
16 Threaded spindle
17 Lugs
18 Groove
19 Centric load
20 Eccentric load
21 Compression spring
22 Molded section
22a Recess
22b Contact surface
23 Connecting element
24 Closing element
25 Piston
26 Canal
27 Seal
28 Seal
29 Valve
30 Gas
31 Seal
32 Seal
33 Gas spring
34 Indicator mark
35 Scale
36 Support arm

The invention claimed is:

1. A weight-measuring device for vehicle lifting platforms, which can be arranged between a height-adjustable supporting element and a vehicle which is to be lifted, wherein an upper part and a lower part form a cavity which is filled with a hydraulic fluid or with a gas and generates in the cavity, by means of a load lying on top, a hydraulic or gas pressure which is measured and/or indicated with a pressure gauge and/or indicator device which is at least partially integrated in the upper part and/or in the lower part, wherein the upper part consists of one piece and is composed of rubber and/or of plastic and/or of some other elastic material and the upper part and the lower part are tightly joined with each other at their outer periphery and/or at their outer edge portion and are forming a membrane cylinder, and wherein at least one canal with a closable opening for filling the cavity with a hydraulic fluid or a gas is arranged in the upper part or the lower part.

2. The weight measuring device according to claim 1, wherein the upper part comprises at least one reinforcement that is implemented as plate, fabric, grid, or fiber.

3. The weight measuring device according to claim 1, wherein the upper part comprises an inner surface section, and an outer surface section that surrounds the surface section at least partially, with the inner surface section having a height that preferably exceeds that of the outer surface section in the upward direction, and/or having a different surface structure, and/or having a different color, and/or consisting of a different material than the outer surface section.

4. The weight measuring device according to claim 1, wherein the upper part comprises at least one bulge at the circumference, and that in the bulge at least one opening is arranged through which the pressure measuring and display device can be read.

5. A weight-measuring device for vehicle lifting platforms, which can be arranged between a height-adjustable supporting element and a vehicle which is to be lifted, wherein an upper part and a lower part form a cavity which is filled with a hydraulic fluid or with a gas and generates in the cavity, by means of a load lying on top, a hydraulic or gas pressure which is measured and/or indicated with a pressure gauge and/or indicator device which is at least partially integrated in the upper part and/or in the lower part, wherein the upper part consists of one piece and is composed of rubber and/or of plastic and/or of some other elastic material and the upper part and the lower part are tightly joined with each other at their outer periphery and/or at their outer edge portion and are forming a membrane cylinder, wherein the upper part comprises at least one annular groove or other shape features like notches or ribs that structurally weaken or strengthen a defined area, and produce a certain, intentional and approximately uniform deformation of the upper part when a centric load or an eccentric load is applied.

6. The weight measuring device according to claim 1, wherein between the upper part and the lower part a compression spring is arranged that has the effect of returning the upper part in unloaded condition to its starting position without hydraulic assistance by the pressure measuring and display device.

7. The weight measuring device according to claim 1, wherein the lower part can be attached to the support element in plate shape and/or by placing it on top of it and/or by pushing it on and/or in a detachable configuration.

8. The weight measuring device according to claim 1, wherein the support element simultaneously forms the lower part of the weight measuring device.

9. A weight-measuring device for vehicle lifting platforms, which can be arranged between a height-adjustable supporting element and a vehicle which is to be lifted, wherein an upper part and a lower part form a cavity which is filled with a hydraulic fluid or with a gas and generates in the cavity, by means of a load lying on top, a hydraulic or gas pressure which is measured and/or indicated with a pressure gauge and/or indicator device which is at least partially integrated in the upper part and/or in the lower part,
- wherein the upper part consists of one piece and is composed of rubber and/or of plastic and/or of some other elastic material and the upper part and the lower part are tightly joined with each other at their outer periphery and/or at their outer edge portion and are forming a membrane cylinder,
- wherein the pressure measuring and display device is arranged at the circumference of the upper part, is of elongated design, and comprises a piston that is moved by the generated pressure and whose indication motion takes place in the circumferential or the longitudinal direction.

* * * * *